Dec. 20, 1927.
H. E. KRAMMER
SHOCK ABSORBER
Filed Sept. 18, 1924
1,653,361
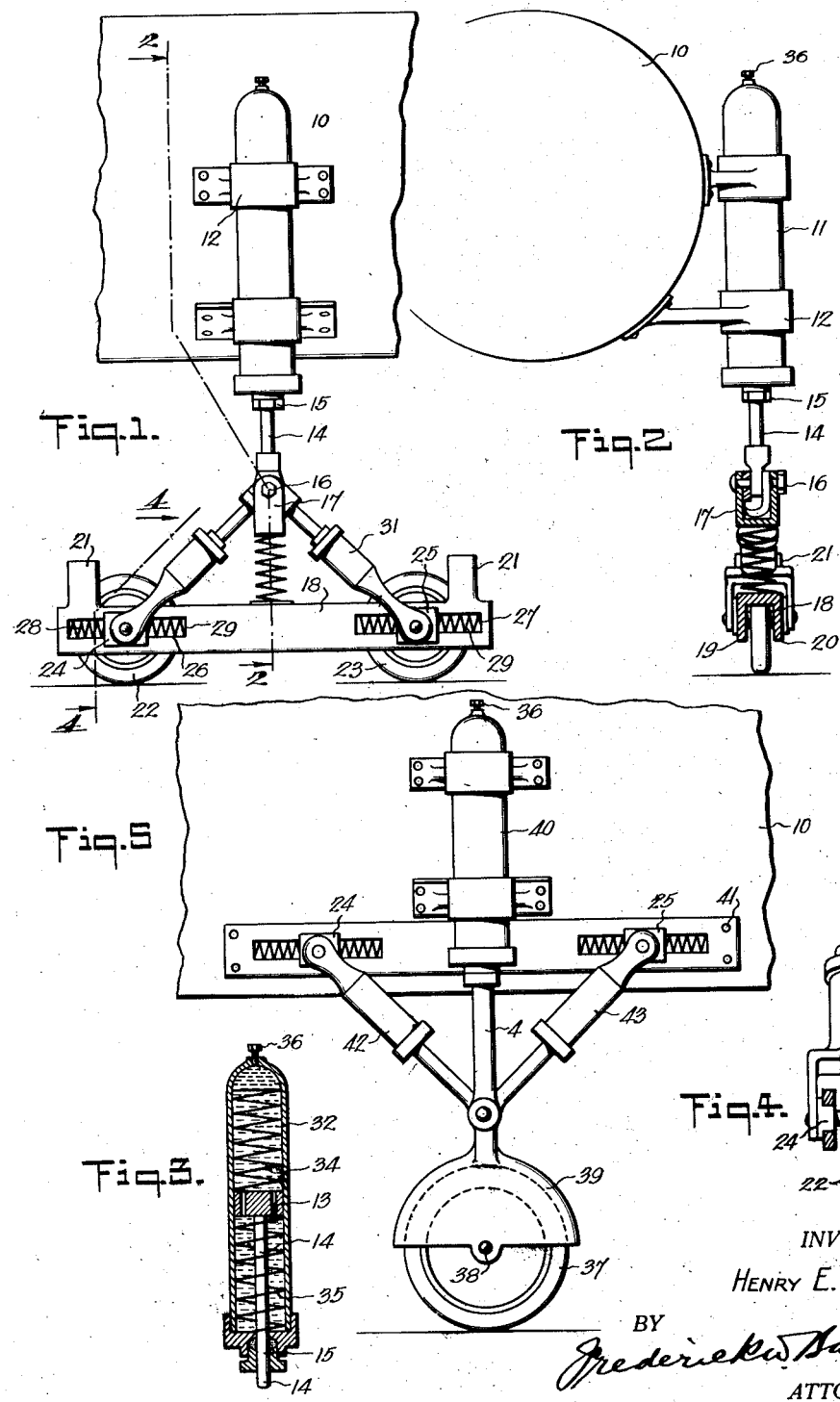
INVENTOR
HENRY E. KRAMMER,
BY
Frederick W. Barker
ATTORNEYS Patented Dec. 20, 1927.

1,653,361

UNITED STATES PATENT OFFICE.

HENRY E. KRAMMER, OF HEMPSTEAD, NEW YORK.

SHOCK ABSORBER.

Application filed September 18, 1924. Serial No. 738,330.

My invention relates to a shock absorber of general application and particularly relates to a shock absorber and landing device designed for use on aeroplanes and similar flight machines.

In aeroplane constructions, it has been usual to mount a shock absorber adjacent the forward end of the machine to constitute a device for cushioning the shocks incidental to landing. It frequently happens, however, especially when the aeroplane is making a forceful landing, that the momentum inherent in the machine after the ground engaging element of the shock absorber has contacted with the ground, that the force of the forward movement of the machine is sufficient to swing it over the landing device as a pivot causing the machine to plunge its nose into the ground.

Accordingly, one of the objects of the invention is to provide a simple form of shock absorber designed to prevent the tipping of the aeroplane nose towards the ground and at the same time not only cushion the landing movement but tend to change the direction of movement in such a way as to cause the aeroplane to dissipate its momentum in a movement along the ground.

Another object of the invention is to provide a shock absorber of the class outlined designed to absorb quickly the initial landing shock and to provide means automatically brought into play for more slowly cushioning the succeeding lowering movements of the aeroplane.

A further object of the invention is to resolve the strain thrust on the ground engaging wheel of the shock absorber in such a direction that some of the strain will be resolved into lines extending parallel to the length of the aeroplane and to absorb the strain in this direction.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:

Figure 1 is a view in side elevation of a shock absorber shown in position on a supporting body constituting part of an aeroplane and illustrating a preferred embodiment of my invention.

Figure 2 is a transverse sectional view taken on the line 2—2 of Figure 1.

Figure 3 is a sectional view taken axially through the upper cylinder shown in Figure 1 but which can be regarded as an illustration of the internal construction of any of the cylinders shown in the several figures.

Figure 4 is a transverse sectional view taken on the line 4—4 of Figure 1; and

Figure 5 is a view similar to Figure 1 showing a modified form of construction.

In the following description and in the claims, parts will be identified by specific names for convenience of expression but they are intended to be as generic in their application to similar parts as the art will permit.

In the drawings there is shown a supporting body 10, diagrammatically representing a portion of an aeroplane and particularly representing one of a pair of shock absorber supporting bodies positioned on opposite sides of the aeroplane and adjacent its forward end, as is usual in the mounting of shock absorbers of this type.

Describing either one of the shock absorbers mounted at the forward end of the aeroplane, it will be noted that there is a vertically disposed cylinder 11 fastened to the supporting member 10 by means of vertically disposed sleeve brackets 12. Slidably mounted in the cylinder 11 is a plunger which includes a plunger head 13 fixed to which is a plunger stem 14 passing through a gland packing cap 15 closing the lower end of the cylinder. The lower end of the stem 14 is pivotally mounted to a pin 16 extending across a U-yoke 17, hanging therefrom.

Particularly describing the form of the invention illustrated in Figure 1, a carriage 18 extends lengthwise of the aeroplane and normally centered beneath the yoke 17. This carriage is of inverted U-shaped form as shown in Figure 2 with opposite ends of the side flanges 19 and 20 connected by means of inverted U straps 21 adapted to overlap portions of the ground engaging wheels 22 and 23 hereinafter described. Sliding journal blocks 24 and 25 have their opposite sides mounted respectively in slots 26 and 27 positioned in the flanges 19 and 20 adjacent the forward and rear end of the carriage. The ground engaging wheels 22 and 23 are pivotally mounted to each of the slide blocks 24 and 25 and contained between the side flanges of the carriage as shown in Figure 2.

A pair of centering springs 28 and 29 is mounted within each of the slots 26 and 27 and have their adjacent ends bearing on their respective blocks 24 and 25 to maintain the same centered in their respective slots. A pair of plungers 30 and 31 are positioned in a plane longitudinally of the aeroplane, with their lower ends bifurcated, as shown in Figure 4, straddling the carriage and pivotally connected respectively to the blocks 24 and 25. These plungers converge towards each other and have their upper ends pivotally connected to each other to the plunger 11 through the agency of the pin 16. The upper ends of the plungers 30 and 31 are flattened and are tightly positioned between the sides of the U-yoke 17 so as to minimize rotary movement of the plungers and connected members out of their normal plane.

Each of the plungers 30 and 31 are similar in construction to the plunger 11 and its contained parts, so that the detailed description of any one cylinder will correspond except for obvious changes in details to all.

The cylinder 11 is fluid tight and is adapted to contain some suitable supply of incompressible fluid such as the oil 32 shown in Fig. 3. The plunger head 13 is provided with a plurality of apertures 33 constituting bleeding vents for permitting the passage of the liquid from one to the opposite side of the plunger head. A pair of balancing springs 34 and 35 are contained within the cylinder and bear on opposite sides of the plunger head tending to center the plunger head within the cylinder and to distribute the liquid on opposite sides of the plunger head. A screw plug 36 at the end of the cylinder opposite the end closed by the cap 15 provides a means for filling the cylinder with the bleeding liquid.

In the modified form shown in Figure 5, but one ground engaging wheel 37 is used. The wheel is pivotally mounted on an axis 38 contained in a hood 39 constituting the lower part of the plunger 40 corresponding in position and function to the plunger 11 hereinbefore described. In this case the carriage for guiding the blocks 24 and 25 is mounted directly on the supporting member 10 being fastened thereto by means of rivets 41. The plungers 42 and 43 corresponding to the plungers 30 and 31 hereinbefore described differ in their position in that they extend upwardly rather than downwardly from their pivotal connection.

In operation, and with the device in the normal position shown in Figure 1 and assuming that the aeroplane is making a head forward landing striking the ground at an angle, the forward pair of wheels will first strike the ground causing the forward wheels to, in effect, rise from the position shown in Figure 1, twisting the carriage about the pivotal axis, thus tending first to elongate the plunger 31. Immediately following this movement the rear wheels 23 will contact with the ground and both plungers 30 and 31 will tend to contract. At the same time the plungers will act upon the plunger 11 causing the first named plungers, carriage and co-acting parts to move towards the aeroplane structure. During this movement it is obvious that the character of the triangle formed by the carriage and plungers 30 and 31 will be modified which action will tend to compress the springs on the outside of the sliding blocks and will compress the vertically disposed springs positioned between the blocks. The initial shock of landing will be taken up, first by the several spring structures and the succeeding lowering movement of the aeroplane will be regulated by the passage of the liquid through the bleeding ports in the head of the several plungers disclosed.

In the form of the invention illustrated in Figure 5 when the single wheel engages the ground there will be the usual upward movement of the same, but at the same time the angularly disposed plungers will react on their sliding blocks to move the same longitudinally of the length of the machine and against the action of the balancing springs controlling the same. When released of tension the several springs will tend to return the parts into their normal position illustrated.

It will be noted that by means of a device of the character illustrated, the shocks which are ordinarily transmitted along one line are resolved into a triangularization of forces and resilient means are positioned to absorb the shocks, so resolved into components.

By means of such a construction a lighter type of springs may be utilized and advantage can be taken on the quick acting of light springs and at the same time the accumulated action of the light springs will be sufficient to withstand and absorb the usual shocks incidental to the use of such machines.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In an aeroplane, the combination of a supporting body, a shock absorber provided with a pair of ground engaging wheels disposed in tandem and adjacent the forward end of the aeroplane, a connection with the body including a forwardly and downwardly inclined support for the forward wheel and a rearwardly inclined support for the rear wheel, said supports having their upper ends pivotally connected together, said forward support and wheel adapted to swing up towards the body, said wheel adapted when striking the ground to move forwardly of its normal position and resilient means for resisting the movement of the wheel forwardly of the aeroplane along the ground.

2. In an aeroplane, the combination of a supporting body, a ground engaging member pivoted thereto and engaging the ground at a plurality of points spaced longitudinally of the aeroplane, means for guiding the forward point of said member for movement in a right line and means for cushioning the swinging movement of the ground engaging member about its pivot.

3. In an aeroplane, the combination of a supporting body, a carriage extending lengthwise beneath said body, a pair of ground engaging wheels mounted in tandem in said carriage and adapted to move relative to each other lengthwise of the carriage, a plunger carried by the body and depending therefrom, and a pair of plungers pivoted together and to said depending plunger and having their lower ends attached to said wheels.

4. In an aeroplane, the combination of a supporting body, a carriage extending lengthwise beneath said body, a pair of ground engaging wheels mounted in tandem in said carriage and adapted to move relative to each other lengthwise of the carriage, a plunger carried by the body and depending therefrom, and a pair of plungers pivoted together and to said depending plunger and having their lower ends attached to said wheels, said plungers each constituting a liquid operated dash pot.

5. In an aeroplane, the combination of a supporting body, a carriage extending lengthwise beneath said body, a pair of ground engaging wheels mounted in tandem in said carriage and adapted to move relative to each other lengthwise of the carriage, a plunger dash pot carried by the body and depending therefrom, a pair of plunger dash pots pivoted together and to said depending plunger dash pot and having their lower ends attached to said wheels, and resilient means carried by each of the dash pots for maintaining the same in normal position.

6. A shock absorber including three plungers having their adjacent ends pivoted together at a common point, one of said plungers provided with means for attaching it to a supporting body, sliding blocks pivoted to the free ends of the other two plungers, a frame for guiding said blocks, springs carried by the frame for maintaining said blocks in their normal position, and a pair of wheels, one carried by each of said sliding blocks.

7. A shock absorber including three plungers having their adjacent ends pivoted together at a common point, one of said plungers provided with means for attaching it to a supporting body, sliding blocks pivoted to the free ends of the other two plungers, a frame for guiding said blocks, springs carried by the frame for maintaining said blocks in their normal position, a pair of wheels, one carried by each of said sliding blocks, and a spring disposed between said frame and the plunger provided with the supporting means for maintaining the pivotal point of the plungers spaced from the frame.

8. A shock absorber including a cylinder, means for mounting the cylinder in position, a depending plunger slidably mounted in said cylinder, a ground engaging wheel operatively connected to said plunger to move the same in its cylinder when the wheel engages the ground, a pair of supplemental cylinders, plungers mounted in said supplemental cylinders and each pivotally connected to the first named plunger, and adapted to swing in the plane of the wheel, said supplemental plungers extending at an angle to each other and to the first named plunger, and adapted to be moved in their respective cylinders when the wheel engages the ground and cushioning means within each cylinder.

9. A shock absorber including a cylinder, means for mounting the cylinder in position, a depending plunger slidably mounted in said cylinder, a ground engaging wheel operatively connected to said plunger to move the same in its cylinder when the wheel engages the ground, a pair of supplemental cylinders, plungers mounted in said supplemental cylinders and each pivotally connected to the first named plunger, and adapted to swing in the plane of the wheel, said supplemental plungers extending at an angle to each other and to the first named plunger, and adapted to be moved in their respective cylinders when the wheel engages the ground, cushioning means within each cylinder, and resilient means engaging the ends of the supplemental cylinders opposite the plunger ends for maintaining the cylinders in normal position.

Executed this 16th day of September, 1924.

HENRY E. KRAMMER.